3,246,393
PROCESS FOR REMOVING A FITTING FROM A HOSE
Robert Franklin Worth, Fort Worth, Tex., assignor to Stratoflex, Inc., Fort Worth, Tex., a corporation of Texas
Filed Nov. 29, 1962, Ser. No. 240,825
5 Claims. (Cl. 29—426)

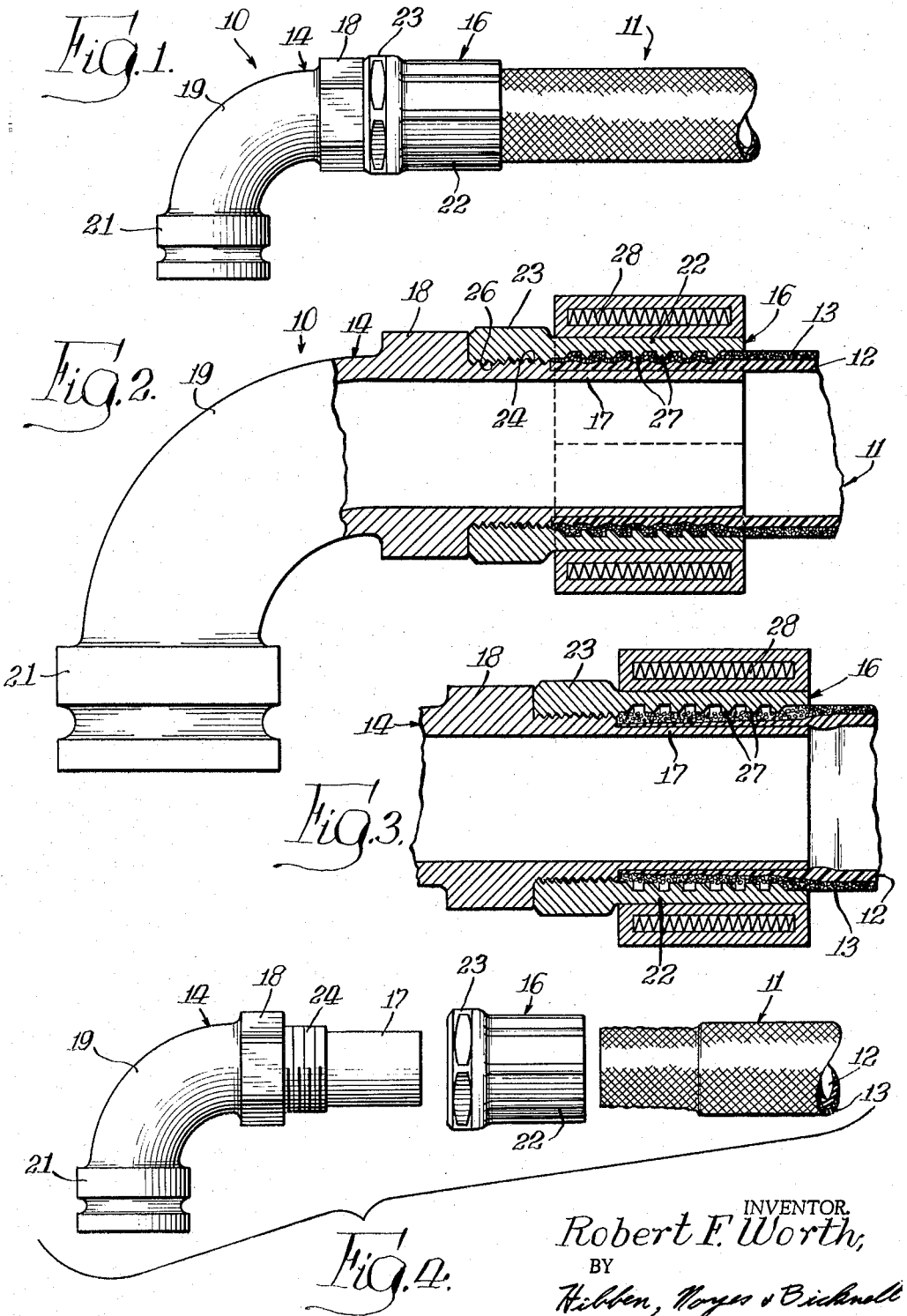

This invention relates to a process for removing a fitting from a hose.

A common type of industrial hose comprises a flexible inner tube of a plastic material, such as polytetrafluoroethylene, known in the trade as "Teflon," surrounded by a braided wire reinforcement. This type of hose is frequently permanently attached to a fittting having a nipple and a socket, or a fittting having a socket and nipple with an insert therebetween, by inserting a hose end between the nipple and the socket and compressing the hose, usually by crimping or swaging the socket to reduce its diameter. The compressive force on the hose makes removal of the house from the fittting very difficult, and the entire assembly is usually thrown away when, for example, the hose is damaged, even though portions of the fitting may not be damaged. When the fitting is an expensive type, such as an elbow fitting, a swivel fitting or a large straight fitting, it is obvious that a process for removing the hose from the fitting without damaging the fitting so that portions of the fitting, such as the nipple, may be salvaged would be advantageous.

Accordingly, it is the promary object of this invention to provide a novel process for removing a hose from a fitting without damaging the fitting.

It is another object to provide an economical process for salvaging portions of the hose fitting.

Other objects and advantages of the invention will become apparent from the following detailed description taken in conjunction with the accompanying figures of the drawing, in which:

FIG. 1 is an elevational view of a fittting having a hose secured thereto;

FIG. 2 is an enlarged view partially in section showing an initial step in saparating the hose and the fitting;

FIG. 3 is a view of the fragment of FIG. 2, showing a subsequent step; and

FIG. 4 is an exploded view showing the hose separated from the fitting.

As previously stated, a process embodying the invention is for separating a hose, including a flexible inner tube and an outer reinforcement, from a fitting including a nipple and a socket, the hose having been previously attached to the fitting by compressing the hose between the nipple and the socket. The process comprises generally the steps of positioning the hose and fitting adjacent a heat source and heating them until the inner tube is soft and fluid. At this temperature the inner tube partially decomposes and flows readily out of the area of high compression within the fitting. The compressive force on the hose is thereby eliminated or reduced sufficiently to permit the outer reinforcement to be pulled out from between the socket and the nipple. Thereafter, the socket may be disconnected from the nipple, permitting salvage and reuse of undamaged portions of the fitting.

The invention has been shown in connection with a fitting comprising a socket and a nipple. Thus, FIG. 1 illustrates a fitting, indicated generally by the numeral 10, secured to a hose indicated generally by the numeral 11. The hose 11 includes a flexible inner tube 12, FIG. 2, of Teflon or other plastic material, and an outer reinforcement 13, such as a wire braid.

The fittting 10 is an elbow type, and includes a nipple 14 and a socket 16. The nipple 14 includes a hollow tubular portion 17 adapted to be inserted into the end of the hose 11, an enlarged portion 18 having external wrench engaging flats formed thereon, an arcuate portion 19, and a portion 21 adapted to be attached to another fitting or coupling member (not shown). The socket 16 includes an annular portion 22 adapted to be positioned around the end of the hose 11, and an enlarged portion 23 having external wrench engaging flats formed thereon. The nipple 14 and the socket 16 are provided with mating threaded portions 24 and 26, respectively, for the purpose of connecting these two members together. The socket 16 is further provided with a plurality of annular hose engaging ribs 27 on its inner periphery.

The portion of the hose in the opening between the socket and the nipple is held in the fitting by a compressive force produced by reducing the diameter of the socket, as by crimping or swaging the portion 22. As shown in FIG. 2, the ribs 27 dig into the reinforcement 13 and prevent the hose 11 from being forced or pulled out of the fitting 10 while the hose and fitting are being used.

Thus, while the socket has been distorted from its original condition by the crimping, the nipple which is the most expensive part of the assembly may not be damaged or distorted.

When it is no longer desired to use this hose and fitting combination, the nipple 14 may be salvaged for future use, in accordance with this invention, by positioning the portion 22 of the socket 16 adjacent a suitable heat source, such as an induction heating coil 28, FIGS. 2 and 3.

The coil 28 is sized to heat the reduced diameter portion 22 of the socket 16, the tubular portion 17 of the nipple 14, and the portion of the hose reinforcement 13 between the socket and the nipple. These heated portions transfer heat to the inner tube 12, and the heat output of the coil 28 and the length of time it is applied are adjusted such that the temperature of the inner tube 12 is raised to nearly its decomposition temperature. At this temperature the inner tube 12 becomes very soft and fluid and will be forced out of the high compression area within the fitting. As it flows out, the compressive force on the reinforcement 13 is eliminated, and the inner tube will become quite thin and the reinforcement will be released from the ribs 27 as shown in FIG. 3, so that the reinforcement 13 may be pulled completely out of the fitting. Thereafter, the socket may be rotated relative to the nipple to unscrew and separate them as shown in FIG. 4. Since the socket has been previously crimped it cannot be reused, but the nipple is normally undamaged and may be used again.

The amount of heat applied by the coil 23 must be held within limits determined by the inner tube 12 material and the material of the part to be salvaged. The temperature must be above the temperature at which the inner tube becomes very soft and fluid but below the temperature at which the part to be salvaged will be damaged. As a specific example, for an inner tube made of Teflon, the temperature of the inner tube should be at least 550 to 600 degrees Fahrenheit. When the part to be salvaged is made of aluminum, its temperature should be held below 700 to 800 degrees Fahrenheit, and when it is made of stainless steel with silver soldering, its temperature should be held below 1000 degrees Fahrenheit. The temperatures for other materials may be easily obtained from standard reference books.

While the heat source has been described as an induction heating coil other sources such as a controlled combustion of liquid or gaseous fuel may be used. If the heat is concentrated in a limited area, the fitting should be rotated within this area to heat the fitting evenly. While the drawing illustrates the situation where the socket is crimped to apply a compressive force on the hose and to hold it in the fitting, the process may also be employed to remove a hose from a fitting where the compressive force is produced by expanding the nipple using a mandrel. The process may also be used on a fitting comprising a socket and a nipple with an insert therebetween. When used on such a fitting, the insert as well as the nipple may be salvaged.

I claim:

1. A process for disconnecting a hose from a fitting, the hose comprising an inner tube of flexible material surrounded by a reinforcement, and the fitting comprising a nipple and a socket, the hose being positioned between the nipple and socket and compressed thereby, comprising the steps of heating the fitting and the hose to the temperature at which the inner tube becomes soft and fluid and pulling the reinforcement out from between the socket and the nipple.

2. A process as in claim 1 wherein the nipple and the socket are initially detachably connected together, and further including the step of detaching the nipple from the socket after the hose is withdrawn from the socket.

3. A process as in claim 1, wherein the amount of heat supplied is such that the temperature of the inner tube is sufficient to make it soft and fluid but is insufficient to damage the nipple and the socket.

4. A process for separating a hose from a fitting and salvaging portions of the fitting, the hose including an inner tube of flexible material and an outer reinforcement, and the hose having been secured to the fitting by compressing the hose within the fitting, comprising the steps of positioning the fitting and the hose adjacent a heat source, heating the fitting and the hose sufficient to render the inner tube soft and fluid, and pulling the reinforcement out of the fitting, whereby the fitting may be disassembled and portions thereof salvaged.

5. A process for separating a hose from a fitting, the hose including an inner tube of flexible material and an outer metallic reinforcement, and the fitting comprising a socket and a nipple threadedly connected together, the hose being positioned between the socket and the nipple and the socket having been swaged or crimped, comprising the steps of heating the fitting and the hose to above the temperature at which the inner tube becomes soft and fluid and below the temperature at which the nipple is damaged, whereby the soft and fluid condition of the inner tube eliminates the compressive force on the reinforcement caused by the swaged or crimped condition of the socket, thereafter pulling the reinforcement out from between the socket and the nipple, and unscrewing the socket from the nipple to disconnect the socket from the nipple, whereby the nipple may be salvaged.

References Cited by the Examiner

UNITED STATES PATENTS

| | | | |
|---|---|---|---|
| 2,992,017 | 7/1961 | Dritz. | |
| 3,130,493 | 4/1964 | Scudieri | 29—401 XR |
| 3,185,500 | 5/1965 | Luther | 29—426 XR |

FOREIGN PATENTS

| | | |
|---|---|---|
| 748,454 | 5/1956 | Great Britain. |

CHARLIE T. MOON, *Primary Examiner.*